United States Patent [19]

Rossmann

[11] Patent Number: 4,671,622

[45] Date of Patent: Jun. 9, 1987

[54] ZOOM LENS MOUNT

[75] Inventor: Dieter Rossmann, Aalen, Fed. Rep. of Germany

[73] Assignee: Carl-Zeiss-Stiftung, Heidenheim on the Brenz, Fed. Rep. of Germany

[21] Appl. No.: 779,703

[22] Filed: Sep. 24, 1985

[30] Foreign Application Priority Data

Sep. 27, 1984 [DE] Fed. Rep. of Germany ... 8428377[U]

[51] Int. Cl.$^4$ .............................................. G02B 7/04
[52] U.S. Cl. ..................................................... 350/430
[58] Field of Search .............................. 350/436, 429

[56] References Cited

U.S. PATENT DOCUMENTS

| | | | |
|---|---|---|---|
| 4,275,952 | 6/1981 | Uesugi | 350/429 |
| 4,421,389 | 12/1983 | Muryoi | 350/429 |
| 4,448,496 | 5/1984 | Isobe et al. | 350/430 |
| 4,533,218 | 8/1985 | Nakazato et al. | 350/430 |

Primary Examiner—John K. Corbin
Assistant Examiner—Loha Ben
Attorney, Agent, or Firm—Stonebraker, Shepard & Stephens

[57] ABSTRACT

A zoom lens mount in which all adjustments for variation of focal length and for focusing at all focal lengths as well as marco-focusing can be accomplished by manipulation of a single external operating ring. Movements are smooth from one position to another, eliminating or reducing the danger of jamming which has occurred with some prior constructions. Focal length is adjusted by axial displacement of the operating ring, and focusing by rotation of the operating ring. In the wide-angle position, marco-focusing can also be accomplished with the same operating ring.

8 Claims, 3 Drawing Figures

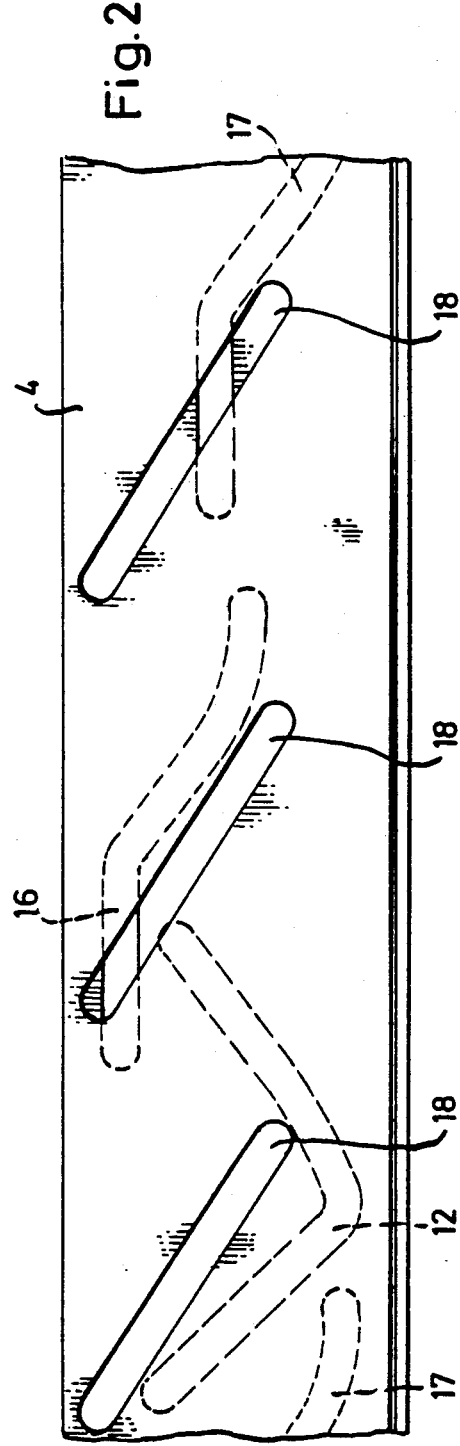
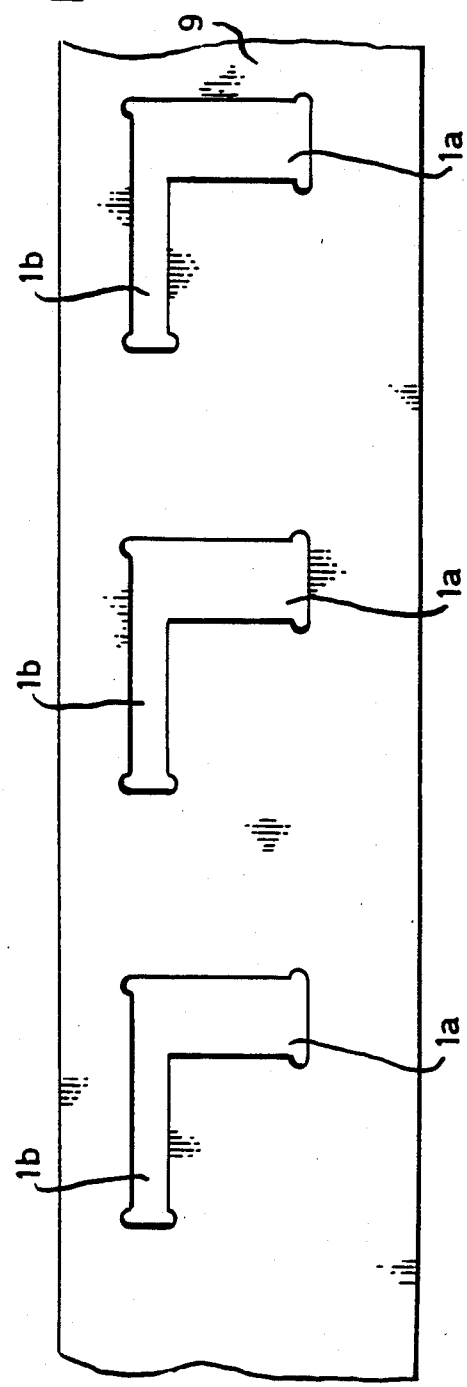

ZOOM LENS MOUNT

This invention relates to a variable focal length lens or zoom lens of the kind which has a single operating ring manually operable for changing the effective focal length of the lens (zooming the lens), for focusing the lens and for closeup (macro) operations.

In the case of zoom lenses having provision for macro or close-up focusing, it is desirable to have a construction which permits a simple continuous movement throughout the entire range from the tele or maximum focal length position through the wide angle position and the macro or close-up position.

From German Offenlegungsschrift (published but unexamined patent application) Patent application no. 30 38 378, published April 30, 1981, and the corresponding U.S. Pat. No. 4,448,496 of Isobe et al., granted May 15, 1984, it is known to provide a zoom lens mount in which a single actuating element performs the tele setting, the changing of the focal length, and the close-up setting. In this known zoom lens mount, an actuating element displaces one of the lens holders of the lens, and turns and displaces the other lens holder of the lens. In order to control these movements, a cam tube having outer cam curves is provided, the cam curve which serves for the macro-setting having a branch which connects at a right angle. When the guide curves for the movement of the lens mountings are developed in this manner, there is danger of jamming or blocking when changing to macro settings.

The object of the present invention is to provide an improved mount for zoom lenses, in which a single operating ring serves for adjustments throughout the entire range from longest focal length or tele setting through the shortest focal length or wide angle setting to the close-up or macro setting, with smooth movements without danger of jamming or clamping or blocking during the course of the movements, and which permits easy focusing in all of these ranges and does not require any groping or difficult manipulation in order to adjust to the various individual ranges or to perform accurate focusing in any of the ranges.

SUMMARY OF THE INVENTION

According to the invention, these objects are accomplished by providing a lens mount having a single operating ring for setting the lens to the desired range (i.e., to the desired focal length) and having a fixed tubular body, with a carrier ring arranged between the tubular body and the operating ring. Guide grooves are provided for controlling movement of the carrier ring and operating ring within the range of adjustment of the focal length and the close-up or macro setting ranges. A first lens holder is provided for the first or front lens element group, and a second lens holder for the second or rear lens element group. Also there is a cam tube between the operating ring and the tubular body, and this cam tube has a set of outer cam curves on its outer surface, and another set of inner cam curves on its inner surface. Between the first lens holder and the second lens holder there is an intermediate element. The second lens holder has a driver part which engages in the inner cam curves of the cam tube, and the carrier ring has guide parts which engage in the outer cam curves of the cam tube and into the guide grooves of the tubular body. As a result of this, when a displacing force is exerted on the operating tube in the direction of the optical axis, a displacement force acts on one or both of the lens holders. A detent roller is provided in a bearing groove on the carrier ring, which connects the operating ring in a starting or end position with the carrier ring, so that in this position a rotation of the operating ring around the optical axis produces axial displacement of one or both lens holders.

BRIEF DESCRIPTION OF THE DRAWINGS

A preferred embodiment of the invention will be described in connection with the accompanying drawings, in which

FIG. 2 is a view of the cam tube showing the outer and inner cam curves; and

FIG. 3 is a view of the tubular body, showing the guide grooves therein.

DESCRIPTION OF THE PREFERRED EMBODIMENT

Figure 1:
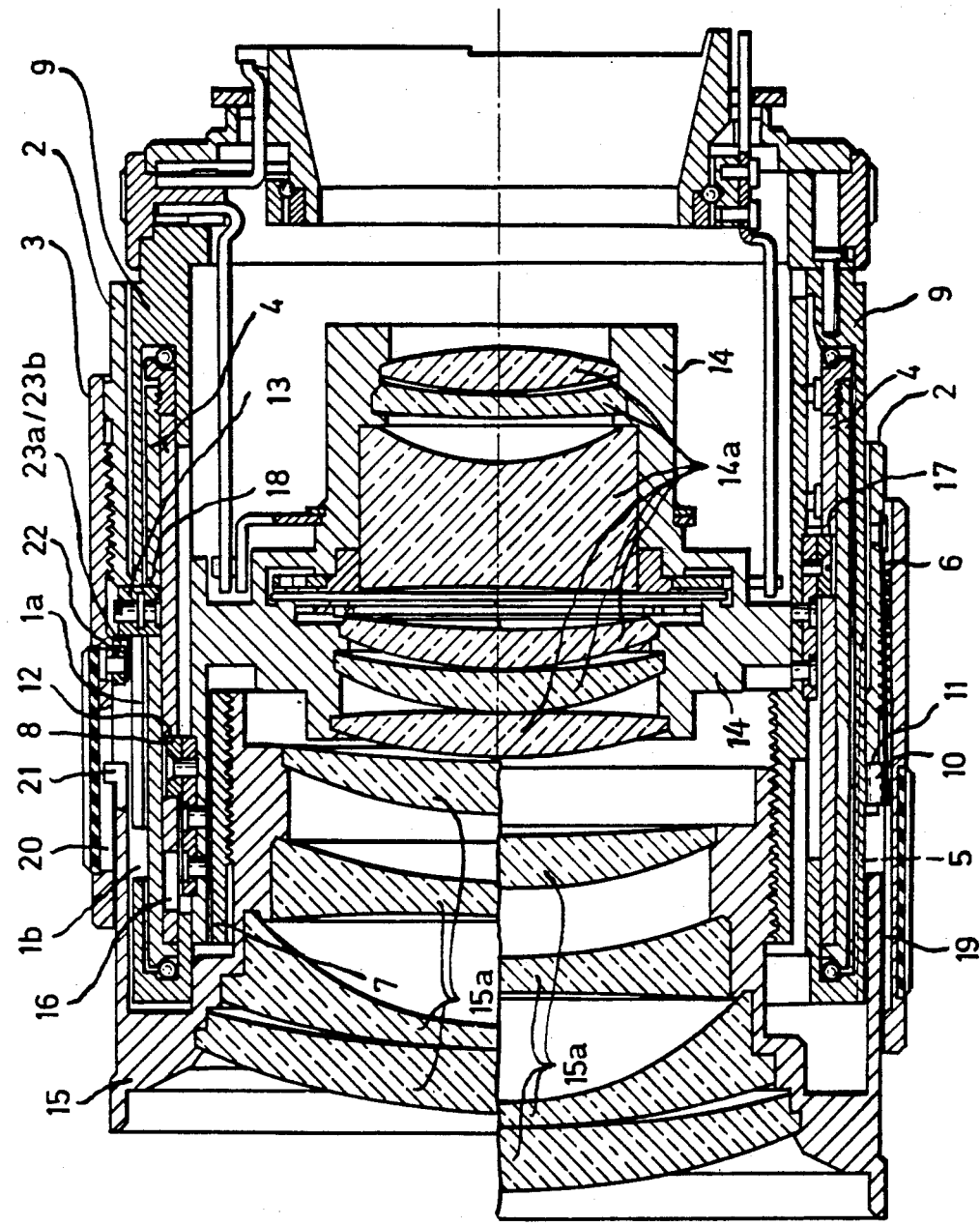
FIG. 1 is a diametrical axial section through the lens mount, the parts in the upper half of the view, above the optical axis, being shown in a different position of adjustment from those in the lower half.

The mount comprises a fixed tubular body 9, the rear end of which (right hand end, viewed as in FIG. 1) is adapted to be mounted detachably in a fixed position on the front of a camera. The mounting means is conventional and need not be shown or described in detail. It may include the usual bayonet type lugs mating with lugs on the body of the camera.

This tubular body 9 serves to support, preferably by ball bearings as illustrated, a cam tube which is rotatable about the optical axis. The cam tube has inner cam curves in the form of grooves 12, 16, and 17 (see FIG. 2 as well as FIG. 1) formed on the inner surface of the tube, and outer cam curves in the form of grooves 18 formed on the outer surface of the tube. It would be possible to mill these grooves into the inner and outer surfaces, respectively, of a single thick tubular member, but for ease and economy of manufacture it is preferred to make the cam tube of two separate tubular members, one fitting snugly inside the other as illustrated in FIG. 1. With this arrangement, the interior cam curves 12, 16, and 17, can more easily be formed as grooves or slots extending all the way through the thickness of the inner member of the tube; the exterior cam curves can be formed as grooves or slots extending all the way through the thickness of the outer member; and then the two members can be snugly fitted together in proper relation to each other to form what is, in effect, a single tubular member or cam tube, designated as a whole by the numeral 4.

Mounted for axial movement within the tubular body 9 are two lens holders, a first or front lens holder 15, and a second or rear lens holder 14. The holder 15 mounts a front group of lens elements or components collectively indicated at 15a, and the holder 14 mounts a rear group of lens elements or components collectively indicated at 14a. A conventional diaphragm or stop, schematically illustrated but not separately numbered, may be located in the rear group. A portion of the front lens holder 15 is externally screw threaded to engage internal threads on an intermediate tubular element 7. If the front lens holder 15 is rotated about the optical axis while the intermediate element 7 is held against rotation, the lens holder will travel axially relative to the intermediate element, for focusing purposes.

Riveted to the rear lens holder 14 is a driver part 8 which projects radially outwardly, through a longitudinal guide slot in the inner wall section of the fixed tubular body 9 and into a cam curve or groove 12 in the inner surface of the cam tube 4. This is illustrated in the upper part of FIG. 1. A similar driver part, shown in the lower portion of FIG. 1, is riveted to the intermediate tubular element 7 and projects radially outwardly through a longitudinal guide slot in the inner wall section of the double-walled body 9 and into a cam curve or groove 17 in the inner surface of the cam tube 4.

A carrier ring 2 surrounds the fixed tubular body 9. An operating ring 3 surrounds the carrier ring 2 and is screwed onto it. This operating ring has a longitudinal internal groove 20 which slidably receives a hook 21 on the front lens holder 15. By means of this connection, the front lens holder may be turned for focusing, by turning the operating ring 3.

The carrier ring 2 has a groove block or cam driver member 13 which extends radially inwardly from the ring 2, through a guide slot 1a, 1b in the outer section of the double-wall part of the tubular body 9, and into the cam curve or groove 18 formed in the outer surface of the cam tube 4 which is received rotatably but not movable axially within the space between the inner and outer double walls of the tubular body 9, that is, within the hollow wall portion of this body.

A leaf spring 6 is riveted to the carrier ring 2. This spring presses a detent roller 10 in a bearing groove 11 in the carrier ring 2, against a longitudinal groove 5 formed in the tubular body 9. On the operating ring 3 there is a stop segment 22. When the operating ring is rotated relative to the carrier ring, for purposes of focusing, this stop segment 22 strikes against the stop surfaces 23a and 23b on the carrier ring, to limit the range of rotation to focus settings of infinity at one end of the range and 0.7 m at the other end of the range. The operating ring also has an internal groove 19 into which the leaf spring can enter in the finite stop position.

By this arrangement, the result is obtained that all settings can be effected by means of the operating ring 3. The focal length is varied by axial displacement of the operating ring, and focusing is accomplished by rotating the operating ring. If the focal length is set to the long focal length or telephoto range, one can focus only from infinity to 0.7 meter the macro-setting range is blocked by the stop segment 22 engaging with the stop surface or abutment surface 23b, and by the groove block 13 in the guide grooves 1a, 1b.

If the lens is set to the wide-angle or short focal length position, then macro-focusing can be obtained when the operating ring 3 is positioned to place the groove block 13 in the circumferentially elongated portion 1b of the groove in the tubular body 9, pressure to accomplish this movement being exerted through contact of the stop segment 22 against the surface 23b.

In this way, axial displaceability (setting for different focal lengths) of the carrier ring 2 and thus also of the operating ring 3 is blocked. At the same time, the detent roller 10 is pushed out of the longitudinal groove 5 on the body 9, via the bearing groove 11, and this presses the leaf spring 6 into the locking groove 19 on the operating ring, thus producing a form-lock of the operating ring 3 to the carrier ring 2 so that the two rings must turn together so long as this interlocked condition exists. Thus it is possible to come again into the starting position, namely, the macro switching position.

The function of the one-ring operation is obtained in accordance with the present invention by the development of guide grooves 1a which permit displacement of the carrier ring 2 with corresponding groove blocks 13 into the tele positions only upon axial displacement. The macro focusing can be effected here only in the wide angle position for the focal length of 35 mm. In all other focal length ranges, the macro focusing remains blocked.

When the operating ring 3 is grasped and moved axially to vary the focal length of the zoom lens, the carrier ring 2 must move axially with it, on account of the screw thread connection between these two rings. When these rings have moved forwardly out of the wide angle and macro positions toward the maximum telephoto position, the cam driver 13 of the carrier ring 2 enters the part of the guide slot 1a, 1b which is elongated axially and restricted circumferentially, so the rotation of the ring 2 is restricted. The straight axial (longitudinal) movement of the driver 13, acting on the cam curve or slot 18 of the cam tube, will cause rotation of the cam tube. This rotation, in turn, will cause the cam curve 12 of the cam tube to act on the member 8 engaging this cam curve to produce axial movement of the rear lens holder 14, and will cause the cam curve 17 of the cam tube to act on the member engaging this curve to produce axial movement of the intermediate element 7 which has screw threaded engagement with the front lens holder 15, so that the two lens holders will be appropriately positioned axially for the desired focal length. Then the lens may be focused by turning the operating ring 3. The rotary motion will be transmitted through the groove 20 and lug 21 to the front lens holder, which will travel axially on its screw threads relative to the intermediate element 7, for focusing.

The tubular body 9 is sometimes referred to as the index ring, since it may carry various index markings or scale markings.

What is claimed is:

1. A mount for a variable focal length lens, comprising:
   (a) a fixed tubular body (9) having an optical axis extending centrally therethrough:
   (b) a single operating ring (3) surrounding said tubular body and rotatable thereon and movable axially thereon;
   (c) said operating ring serving for setting said lens to a maximum focal length telephoto setting, a minimum focal length wide angle setting, and a close-up macro setting;
   (d) a carrier ring (2) arranged between said tubular body (9) and said operating ring (3);
   (e) guide grooves (1a, 1b) in said tubular body (9);
   (f) means (22, 23a, 23b) limiting movement of said operating ring (3) relative to said carrier ring (2);
   (g) a front lens holder (15) movable within said tubular body for holding a front group of lens elements (15a);
   (h) a rear lens holder (14) also movable within said tubular body for holding a rear group of lens elements (14a);
   (i) a cam tube (4) mounted for rotation between a portion of said tubular body and said operating ring;
   (j) said cam tube having inner cam curves (12, 16, 17) on an inner surface of the cam tube and outer cam curves (18) on an outer surface of the cam tube;

(k) an intermediate element (7) having a threaded connection with said front lens holder and located operationally between said front lens holder and said cam tube;

(l) means (13) operatively connected to said carrier ring and extending into said guide grooves (1a, 1b) for limiting movement of said carrier ring and said operating ring relative to said tubular body, said means extending also into said outer cam curves of said cam tube to cause rotational movement of said cam tube as a result of movement of said carrier ring;

(m) a driver part (8) operatively connected to said rear lens holder and operatively engaged with one of said inner cam curves in such manner that axial position of said rear lens holder is determined by rotational position of said cam tube;

(n) a driver part operatively connected to said intermediate element and operatively engaged with one of said inner cam curves in such manner that axial position of said intermediate element is determined by rotational position of said cam tube;

(o) whereby a displacing force exerted on said operating ring in a direction parallel to said optical axis causes rotation of said cam ring and such rotation of said cam ring positions said rear lens holder and said intermediate element and front lens holder in respective axial positions appropriate to a desired focal length of the lens;

(p) means forming a bearing groove (11) on said carrier ring;

(q) a detent roller (10) in said bearing groove;

(r) means forming a locking groove (19) on said operating ring; and (s) locking means (6) mounted on said carrier ring and shiftable by action of said detent roller to a position extending into said locking groove, for form-locking said carrier ring and said operating ring to each other to turn together, when said locking means extends into said locking groove.

2. The invention defined in claim 1, wherein said detent roller renders said locking means effective in a limit position near one end of a range of adjusting movement of said lens, so that in such position a force of rotation exerted on said operating ring serves to rotate said carrier ring also, and the rotation of said carrier ring rotates said cam tube to cause positioning of said front and rear lens holders by action of said cam grooves.

3. The invention defined in claim 1, wherein said cam tube is formed of an inner tube part and an outer tube part snugly nested together in coaxial relation, said inner cam curves being slots formed through the thickness of said inner tube part and said outer cam curves being slots formed through the thickness of said outer tube part.

4. The invention defined in claim 1, wherein said locking means (6) includes a leaf spring fastened to said carrier ring (2) and having a portion adapted to be deflected into said locking groove (19) by action of said roller (10).

5. A zoom lens mount comprising:

(a) a tubular body adapted to be detachably mounted in a fixed position on a camera, said lens mount having an optical axis extending centrally through the tubular body;

(b) a guide slot in said tubular body, said slot having an axially elongated and circumferentially restricted portion and also an axially restricted and circumferentially elongated portion;

(c) a carrier ring (2) surrounding said body and having limited axial and rotary movement relative to said body;

(d) means (13) connected to said carrier ring and extending into said guide slot for limiting axial and rotary movement of said carrier ring;

(e) an operating ring (3) surrounding a portion of said carrier ring and rotatable thereon and having screw threaded engagement therewith whereby axial movement of said operating ring relative to said body without rotation of said operating ring will produce corresponding axial movement of said carrier ring, and rotation of said operating ring relative to said carrier ring will cause said operating ring to travel axially relative to said carrier ring;

(f) a cam tube (4) mounted for rotation relative to said tubular body and held against axial movement relative thereto, said cam tube having internal cam curves and external cam curves;

(g) a plurality of lens holders mounted for separate axial movement within said tubular body;

(h) means operatively connected to said carrier ring and engaging and interacting with said external cam curves for rotating said cam tube in response to axial movement of said carrier ring; and (i) means operatively connected to said lens holders and engaging and interacting with said internal cam curves for determining axial positions of said lens holders in response to rotation of said cam tube and thus in response to axial movement of said carrier ring.

6. The invention defined in claim 5, further comprising means effective only near one end of a range of axial movement of said operating ring and carrier ring for locking said operating ring and carrier ring together for conjoint rotary movement.

7. The invention defined in claim 6, wherein said locking means comprises a groove (19) in one of said rings, a leaf spring (6) secured to the other of said rings, said leaf spring normally lying outside of said groove, and means for deflecting a portion of said leaf spring into said groove when said two rings are to be locked together.

8. The invention defined in claim 5, further comprising an intermediate member (7) in screw threaded engagement with one (15) of said lens holders, said intermediate member being positioned axially by said means interacting with said internal cam curves, and an operative connection (20, 21) for rotating said one of said lens holders from rotation of said operating ring, to cause said one of said lens holders to travel axially relative to said intermediate member to which it is screw threaded.

* * * * *